June 23, 1953
R. E. BAKER ET AL
2,643,368
PULSE SIGNAL DECODING SYSTEM
Filed Feb. 2, 1951
2 Sheets-Sheet 1
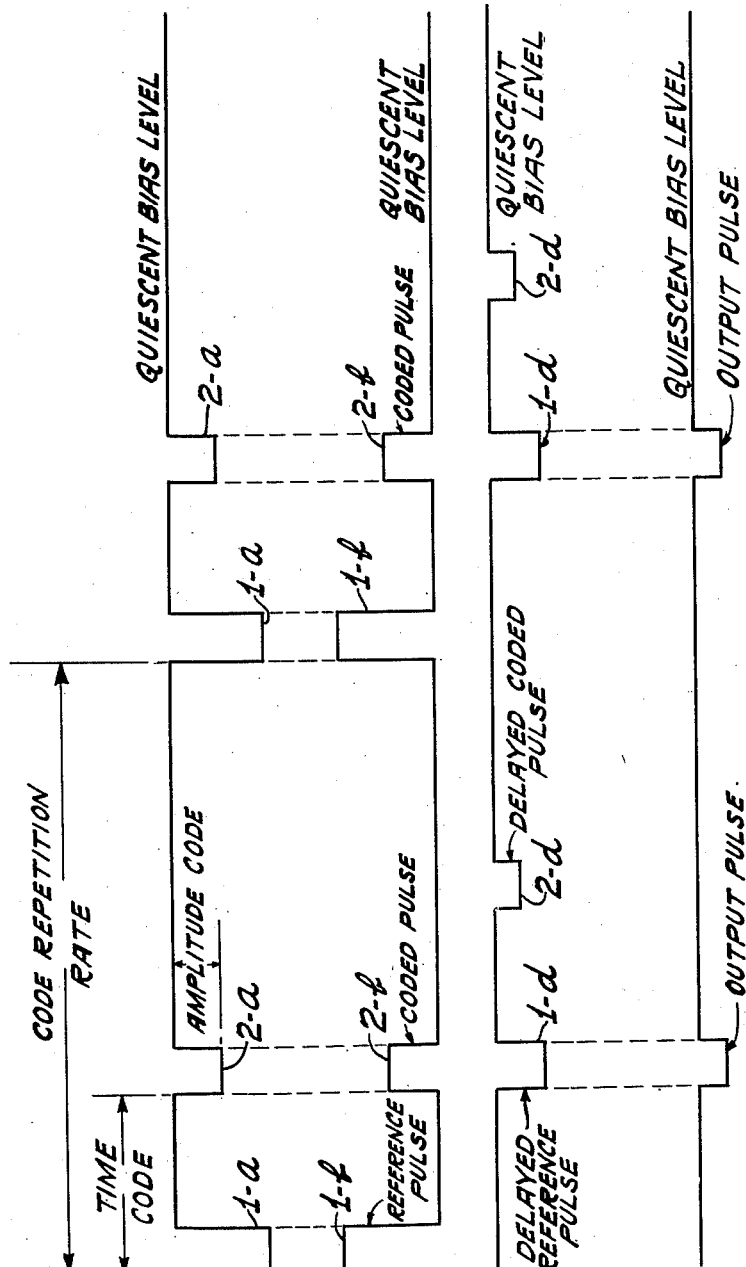
INVENTORS
Richard E Baker
& Frank D. Covely
By: J. L. Whittaker
ATTORNEY

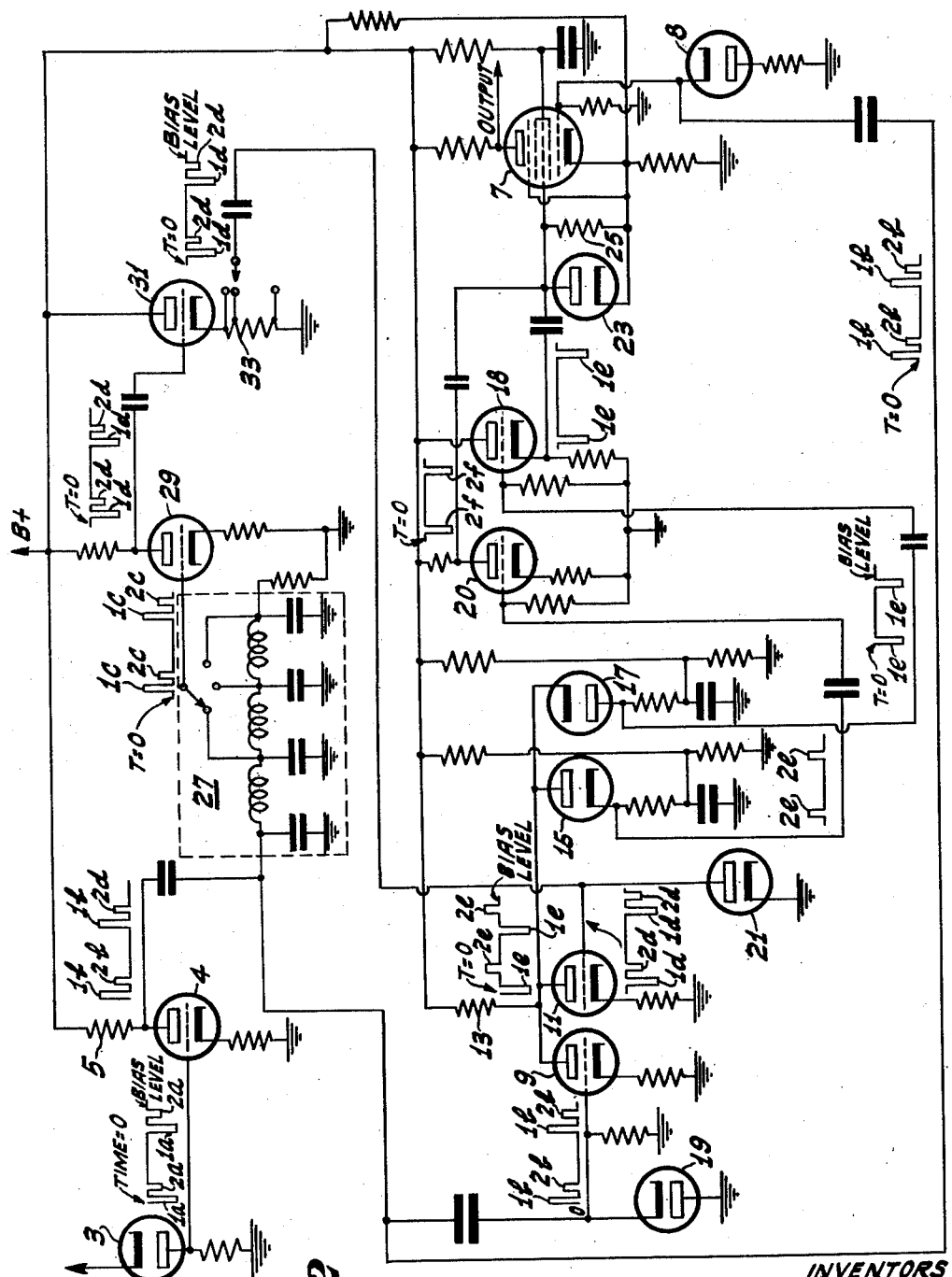

Patented June 23, 1953

2,643,368

UNITED STATES PATENT OFFICE 2,643,368

PULSE SIGNAL DECODING SYSTEM

Richard E. Baker, Woodbury Heights, and Frank D. Covely, Collingswood, N. J., assignors to Radio Corporation of America, a corporation of Delaware Application February 2, 1951, Serial No. 209,093

8 Claims. (Cl. 340—164)

This invention relates generally to decoding systems and particularly to a system for decoding a combined amplitude and time modulated code when the code transmitting source is capable of transmitting a number of different codes in a given time.

Heretofore systems have been used, for example in aircraft, to transmit, receive, and decode information between the airborne craft and the ground station. Such information might, on occasion, concern aircraft bearing, altitude, or ground speed. A coded transmitter actuated by interrogation signals from a radar beacon is one of the most common ways of transmitting such information. Coded pulses from the interrogated transmitter, or transponder, are received, decoded, and displayed on a suitable viewing screen for interpretation thereof. Difficuties arise, however, when a large number of codes is required for a given coding time. An aircraft altitude information code, for example, would require a large number of codes to allow a ground station observer to determine accurately the altitudes of one or more of a plurality of aircraft. Other coding systems using modulation of R.-F. carriers for transmission of desired information have been used, but many of these require much associated circuitry and provide relatively few choices of codes.

It is an object of the instant invention to provide an improved and simplified system for decoding a combined amplitude and time modulated code.

Another object of the invention is to provide a decoding system capable of decoding an amplitude and time modulated code when the number of codes available, for a given coding time, is large.

The present invention provides a system for decoding a transmitted signal that is both amplitude-modulated and time-modulated. The coded signal comprises a pair of pulses displaced from each other by some desired time interval. Varying the time displacement between the two pulses provides a useful time-modulated code. Variation in amplitude of the second pulse of the pair of transmitted pulses provides an amplitude-modulation type code. The integration of these two codes produces a highly flexible code, for a given coding time. For example, transmission of aircraft altitude data may be accomplished by use of suitable servo-mechanisms in conjunction with an aircraft altimeter. The position of the indicating arm of the altimeter pertaining to thousands of feet in altitude may be used for time modulation of a coded signal while the hundreds indicating arm amplitude modulates the pulse generator. This example is merely one of the many applications of such a code and clearly shows the need for a satisfactory decoding system for the code. For explanation of the instant invention the first transmitted pulse shall be called the reference pulse and the second transmitted pulse shall be called the coded pulse.

In accordance with the present invention, the aforementioned transmitted code signals may be decoded by delaying the reference pulse, in a suitable delay network, for a time interval corresponding to the time code and combining the reference pulse and the coded pulse in a suitable mixing device, obtaining a control signal therefrom to provide an indication of accurate decoding.

The invention will be described in greater detail with reference to the accompanying drawing wherein:

Fig. 1-A is a drawing of the transmitted time modulated and amplitude-modulated code;

Figs. 1-B and 1-C are drawings of the voltage wave shapes applied to the grids of a pair of amplifiers comprising a plate mixer;

Fig. 1-D is a drawing of the output wave shape derived from the system; and

Fig. 2 is a schematic circuit diagram of a typical decoding system according to the invention.

The present invention includes, among other associated circuitry, an adjustable time delay line 27, an adjustable level control 33, a pair of voltage amplifiers 9, 11 providing plate mixing, a pair of D.-C. restorers 19, 21 connected to the grids of these voltage amplifiers to refer the base line of the coded pulses to the cathode biases of the appropriate amplifiers, and a pentagrid type gating tube 7. The first control grid of the pentagrid gating tube 7 normally is biased beyond cutoff and the second control grid of the mixer tube normally is maintained at zero bias. For conduction both control grids of the pentagrid mixer tube must operate in a conducting region of their characteristic curves. The reference pulse $1a$ of the coded signal is detected by a video detector tube 3 having an amplifier 4. The reference pulse $1a$ developed across the plate load resistor 5 of the input video amplifier 4 is capacitively coupled to the first control grid of the pentagrid gating tube 7 driving this grid above cutoff. A D.-C. restorer diode 8 is coupled between the first control grid of the pentagrid gating tube 7 and ground. Simultaneously, the reference pulse $1a$ developed across the input amplifier plate load resistor 5 is capacitively coupled to the grid of one 9 of two amplifier tubes 9, 11 comprising a plate type mixer-amplifier. The amplified reference pulse 1e is developed across the common load resistor 13 of the plate type mixer.

This reference pulse 1e causes one 17 of two normally non-conducting oppositely poled diode clippers 15, 17 to pass current. The signal developed in the output circuit of this diode clipper 17 is capacitively coupled to the grid of a cathode follower 18. The reference pulse 1e is capacitively coupled from the cathode circuit of the cathode follower 18 to the second control grid of the pentagrid gating tube 7, thereby driving the second control grid, which is normally biased at zero potential, into the negative cutoff region. The effects of applying a pulse to the first control grid of the pentagrid gating tube 7 driving it above cutoff, coincident with the application of a pulse to the second control grid of the mixer 7 driving it below cutoff, counterbalance each other and no output signal is derived from the pentagrid gating tube 7. A diode 23 shunts the grid resistor 25 of the second control grid, and like the diodes 19, 21 connected to the grids of the respective plate type mixer amplifiers 9, 11 acts as a D.-C. restorer.

The reference pulse 1b developed across the resistor 5 in the plate circuit of the video input amplifier 4 is also coupled to a variable time delay network 27 wherein the reference pulse 1b is delayed for a desired period of time corresponding to that of the pulse time code interval. The delayed reference pulse 1c is then amplified by an amplifier tube 29 and applied to the grid of a cathode follower 31. A potentiometer 33 in the cathode circuit of the cathode follower selects the desired amplitude of the delayed reference pulse 1d to be applied to the grid of the tube 11 of the plate type mixer. When the delay network 27 and the rheostat 33 are properly adjusted, the signal developed by the cathode follower 31 is applied to the grid of the amplifier 11 of the plate mixer coincident with the application of the coded pulse 2b, received from the video amplifier 4, to the grid of the remaining amplifier 9 of the plate mixer. The circuit is so designed that the coincident application of the delayed reference pulse 1d and the coded pulse 2b to the grids of the plate mixer tubes will provide no change in potential in the plate circuit of the mixer, if the signals are of equal amplitude and opposite polarity. This will permit the second control grid of the gating tube 7 to remain at zero bias potential. The positive coded pulse from the input amplifier 4 simultaneously applied to the first control grid of the pentagrid gating tube 7 drives this grid above cutoff, and the pentagrid tube with both control grids above cutoff, conducts and develops an output signal and indicates proper decoding.

The delayed coded pulse 2d causes no signal output from the pentagrid gating tube 7. When it is applied to the amplifier 11 of the plate mixer, a signal is developed across the load resistor 13. The output developed by this delayed coded pulse 2e starts conduction in a diode clipper 15, normally non-conducting, and applies a positive pulse output to an amplifier 20 for amplification thereof. The output of the amplifier 20 applied to the second control grid of the pentagrid gating tube drives the tube 7 further toward cutoff. Thus it is seen from Figs. 1b, 1c and 1d that the reference pulse 1b and the delayed coded pulse 2f cause no conduction in the pentigrid gating tube 7 and a useful ouput signal, shown in Fig. 1b, is obtained from the pentigrid tube 7 only when the delayed reference pulse 1d and the coded pulse 2b are applied to the grids of the plate mixer amplifiers 9, 11 equal in amplitude and opposite in polarity.

What is claimed is:

1. A system for decoding a transmitted signal, said transmitted signal comprising a reference pulse and a pulse coded in time and amplitude with respect to said reference pulse, including a circuit for delaying and controlling the amplitude of said reference pulse, means for mixing said delayed and amplitude controlled reference pulse and said coded pulse, means for obtaining a control signal from said mixing means, gating means, and means for applying said control signal and said coded signal to said gating means to obtain a usable output signal.

2. A system according to claim 1 including means for adjusting said delay circuit for coincident application of said delayed and amplitude controlled reference pulse and said coded pulse to said mixing means.

3. A system according to claim 2 wherein said delay circuit includes means for applying said coincident pulses to said mixing means such that said delayed reference pulse is equal in magnitude and opposite in polarity to said coded pulse.

4. A system according to claim 2 wherein said gating means comprises a multigrid tube having first and second control grids, means normally biasing said first grid below cutoff, means responsive to said coded signal for driving said first grid above cut-off, means normally maintaining said second grid at zero potential upon coincidence of said coded and delayed signals in said mixing means, and means responsive to non-coincidence of said coded and delayed signals for driving said second grid below cut-off.

5. A system according to claim 1 wherein said mixing means comprises a pair of amplifier tubes, said amplifier tubes having a common plate load resistor.

6. A system according to claim 5 wherein said mixing means includes a pair of D.-C. resistors, coupled between the grids of said amplifier tubes and ground.

7. A system according to claim 1 wherein said means for obtaining a control signal from said mixing means includes a pair of oppositely poled, normally non-conducting diodes, said diodes being directly coupled to said mixing means.

8. A system according to claim 1 wherein said means for obtaining a control signal from said mixing means includes an amplifier and a cathode follower, and means coupled to said amplifier and said cathode follower for obtaining and applying said control signal to said gating means.

RICHARD E. BAKER.
FRANK D. COVELY.

References Cited in the file of this patent

UNITED STATES PATENTS

| Number | Name | Date |
|---|---|---|
| 2,189,110 | Honaman et al. | Feb. 6, 1940 |
| 2,372,435 | La Forest | Mar. 27, 1945 |
| 2,403,561 | Smith | July 9, 1946 |
| 2,444,741 | Loughlin | July 6, 1948 |
| 2,564,962 | Hoeppner | Aug. 21, 1951 |

OTHER REFERENCES

Principles of Radar, Radar School, Mass. Inst. of Tech.; 1946; pages 2-35 to 2-37, inclusive.